US007281698B2

(12) United States Patent
Patterson, Jr.

(10) Patent No.: US 7,281,698 B2
(45) Date of Patent: Oct. 16, 2007

(54) MULTI-POSITIONABLE NOTEBOOK COMPUTER CASE

(75) Inventor: John S. Patterson, Jr., Arvada, CO (US)

(73) Assignee: Case Logic, Inc., Longmont, CO (US)

( * ) Notice: Subject to any disclaimer, the term of this patent is extended or adjusted under 35 U.S.C. 154(b) by 784 days.

(21) Appl. No.: 10/646,092

(22) Filed: Aug. 22, 2003

(65) Prior Publication Data

US 2007/0001079 A1    Jan. 4, 2007

Related U.S. Application Data

(60) Provisional application No. 60/405,533, filed on Aug. 23, 2002.

(51) Int. Cl.
*A47B 97/04* (2006.01)
(52) U.S. Cl. ........................ 248/458; 206/756
(58) Field of Classification Search ............... 248/458, 248/448, 447; 206/320, 477, 756, 759, 764, 206/45.24; 404/190, 900, 902
See application file for complete search history.

(56) References Cited

U.S. PATENT DOCUMENTS

| | | | |
|---|---|---|---|
| 1,900,401 A * | 3/1933 | Scully .................... 40/661.06 |
| 4,830,328 A | 5/1989 | Takach, Jr. et al. ......... 248/639 |
| 5,100,098 A | 3/1992 | Hawkins ..................... 248/917 |
| 5,196,993 A | 3/1993 | Herron et al. .............. 361/393 |
| 5,337,212 A | 8/1994 | Bartlett et al. ............. 361/681 |
| 5,511,758 A | 4/1996 | Hsu ........................... 248/461 |
| 5,590,607 A | 1/1997 | Howard ....................... 108/98 |
| 5,708,561 A | 1/1998 | Huilgol et al. ............. 361/681 |
| 5,870,280 A | 2/1999 | Cho ........................... 361/681 |
| 5,873,554 A | 2/1999 | Nobuchi ................. 248/278.1 |
| 5,900,848 A | 5/1999 | Haneda et al. ................. 345/1 |
| 5,915,661 A | 6/1999 | Silverman et al. ....... 248/465.1 |
| 5,926,364 A | 7/1999 | Karidis ....................... 361/681 |
| 6,005,767 A | 12/1999 | Ku et al. .................... 361/681 |
| 6,006,243 A | 12/1999 | Karidis ....................... 708/100 |
| 6,076,787 A | 6/2000 | Troyer ........................ 248/166 |
| 6,105,919 A | 8/2000 | Min ............................ 248/418 |
| 6,256,193 B1 | 7/2001 | Janik et al. ................. 361/683 |
| 6,266,241 B1 | 7/2001 | Van Brocklin et al. ..... 361/687 |

* cited by examiner

*Primary Examiner*—A. Joseph Wujciak, III
(74) *Attorney, Agent, or Firm*—Sheridan/Ross PC

(57) ABSTRACT

A carrying case for an electronic device, such as a tablet personal computer, is provided, and more specifically a case that allows a user to selectively position a display screen of the tablet personal computer by rotation coupled with angular support. The case is easily adapted for use with many types and models of personal electronic devices and may be utilized to view the display screen in a plurality of orientations.

16 Claims, 12 Drawing Sheets

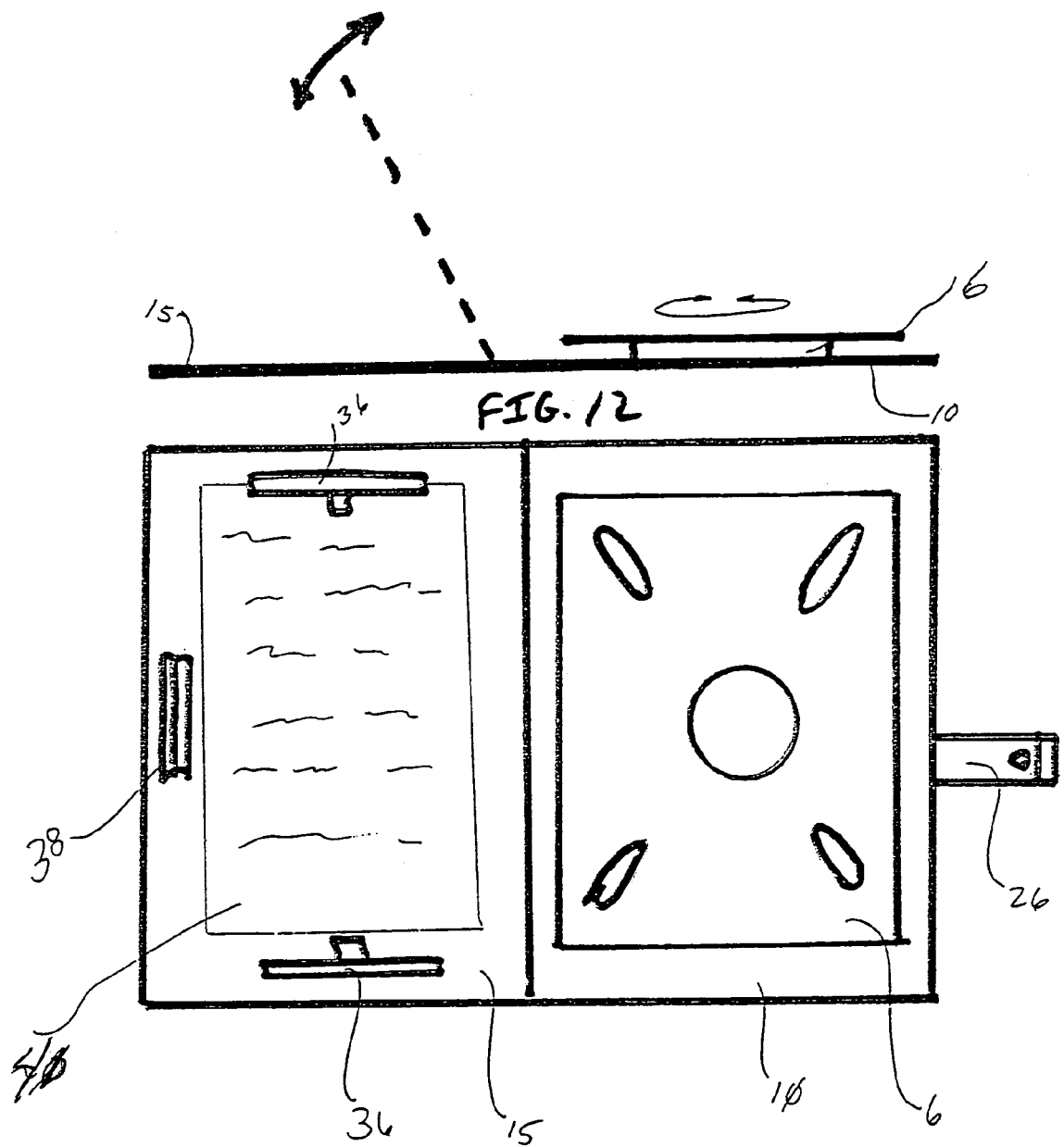

MULTI-POSITIONABLE NOTEBOOK COMPUTER CASE

RELATED APPLICATIONS

This application claims priority to U.S. Provisional Patent Application Ser. No. 60/405,533, filed Aug. 23, 2002, which is incorporated herein by reference in its entirety. In addition, aspects of this application are related to U.S. patent application Ser. No. 09/930,726, filed on Aug. 15, 2001, now U.S. Pat. No. 6,520,466, entitled PERSONAL DIGITAL ASSISTANT (PDA) ATTACHMENT MECHANISM, which is considered to be part of the disclosure of this application, and is incorporated herein by reference in its entirety.

FIELD OF THE INVENTION

The present invention relates to storage and carrying cases, and more specifically a case that is adapted to selectively interconnect with a tablet personal computer and which includes a selectively adjustable stand for holding the computer in a plurality of positions.

BACKGROUND OF THE INVENTION

Various computer companies have developed notebook personal computers ("PCs"), which are similar to large personal digital assistants ("PDAs"), but are about the size of a legal notebook pad. These "tablet" PCs are built in a standard or a convertible form and in a variety of shapes and sizes. For example, Compaq® offers a tablet PC that is similar to a traditional PDA, such that a touch screen is exclusively used to input data into the computer. Conversely, Acer® offers a convertible type of tablet PC that is similar to a notebook computer, such that it is equipped with a keyboard and a screen that swivels and folds over the keyboard in tablet mode. In either form, the tablet PCs have been, and will increasingly become, a useful tool since they are light, store vast quantities of data, and offer the same simplistic features found in PDAs.

Unfortunately, there are some drawbacks to the use of tablet PCs when being viewed by more than one person. More specifically, in order to utilize the larger screen of a tablet PC, the user would have to hold it up or pass it around a meeting or conference room. Thus, some of the benefits of the larger display screen are lost because the user/presenter must hold the tablet PC upright in order for the attendees of the meeting to see the presentation.

Alternatively, the tablet PC may be propped up, but that can lead to other problems such as instability, wherein the tablet PC is more prone to slipping and damage. Further, if a user attempts to prevent slipping by abutting an object against the tablet's lower edge, the view may be partially obstructed. In addition, a propped up tablet PC may not be viewable by every attendee of a meeting because the angle between their line of sight and the plane of the screen may be too shallow. More specifically, as the viewing angle becomes shallow, the image on the screen becomes non-viewable and thus the value of the tablet PC is greatly diminished.

It may also be desirable for the presenter to selectively rotate the screen between portrait view and landscape view, but the problems outlined above still apply. More specifically, a makeshift tilting mechanism may be acceptable for landscape viewing, but may not be ideal for portrait viewing. In addition, it can be easily seen that manual rotation or any unnecessary handling increases the probability of dropping and damaging the expensive tablet PC.

Another drawback to traditional storage cases and support mechanisms is that working on a screen laying flat may be difficult and not ergonomic to the user. In order to write on, or otherwise utilize, a tablet PC it is desirable to prop the tablet PC in an inclined position. Lying a tablet PC flat on a table and writing thereon is not only un-ergonomic, but is more difficult to read because the sight angle is often too shallow. This problem is readily apparent in hand held PDAs, for example the PALM™ handheld, where users hold the device with one hand, tilt the device to a desired angle for viewing and writing, and use the other hand to write. Unfortunately, the size of tablet PCs makes this practice uncomfortable and substantially unmanageable. Alternatively, a user could prop the tablet PC on a desk and use their stomach to brace the lower end. This method is not ergonomic because a user may have to hunch over the tablet PC, which is also impractical for extended periods of use.

Thus, there is a significant need for a carrying case that is adapted to hold and protect a tablet PC, handheld PDA, notebook PC, laptop computer, or other data storage device (hereinafter "electronic device"), that can be easily tilted and selectively rotated between portrait and landscape orientations to facilitate viewing and ergonomic use.

SUMMARY OF THE INVENTION

It is thus one aspect of the present invention to provide a carrying case that incorporates an attachment mechanism to selectively secure an electric device. The case provides a secure location in which the electronic device can be selectively interconnected to prevent damage and to accommodate improved viewing options. The attachment mechanism may be adapted in size and shape to fit a specific brand or type of electronic device and which may be fastened to the attachment mechanism with bolts, screws, adhesives or other means of interconnection. Alternatively, hook and loop fasteners may be employed to selectively interconnect the electronic device to the attachment mechanism. In one embodiment, an attachment mechanism as described in U.S. Pat. No. 6,520,466, may be used to secure the electronic device. This type of resiliently deflecting arm may be easily adapted to accommodate various electronic device sizes and provide sufficient security. Those skilled in the art will appreciate that other fastening means or interconnection mechanisms may be employed to achieve the same object of selectively securing the electronic device to the carrying case.

It is yet another aspect of the present invention that the attachment mechanism be interconnected to a support mechanism capable of inclining it to a desired viewing angle. The support mechanism may be an adjustable hinge mechanism, hook and loop material, a dowel and groove mechanism, as seen in reclining lawn chairs, or any other inclining and supporting means known the art. Thus, a user may selectively alter the electronic device viewing angle in order to fit his or her viewing and data entry needs. The inclining feature preferably contains a plurality of positions that will vary the height and angle of the electronic device so that it will be easily adjusted to a preferred height and inclination.

It is still yet another aspect of the present invention that the attachment mechanism be selectively rotatable. Thus, when lying flat or tilted, the attachment mechanism is capable of rotating 360 degrees. The rotation mechanism may utilize a ball-and-socket, ball bearings, a turntable, restrained magnets, or any other planar rotation means known in the art. Further, it may be desirable to limit the rotation to specific angles, where 0 degrees would be a portrait view and 90 degrees would be a landscape view when the case is opened, for example. Preferably, a locking mechanism for halting the rotation is integrated into the rotation mechanism so that only desired angles can be set. For example, a locked portrait view may be unlocked and transitioned through a 90 degree rotation and locked into a landscape view. Conversely, users sitting face-to-face across a table can utilize a free rotation mode to quickly transition a portrait view, for example, back and forth without moving the entire case. Many people prefer to write in portrait view and display presentations in landscape view. This feature allows the user to quickly and easily change from portrait view for inputting data to landscape view for presenting the data without having to re-tilt the electronic device. Thus, the rotation capability allows a user to input information into the electronic device and present that data in any desired orientation.

It is yet another aspect of the present invention that a second rotation mechanism be added in combination with the attachment mechanism and the first rotation mechanism. In a setting where other viewers have different lines of sight to the electronic device, it is desirable to have the ability to quickly rotate the electronic device to allow viewing from all of the attendees. This embodiment will allow quick rotation if one attendee at a meeting is sitting at a less than an ideal location. For example, when presenting data using an electronic device on a round or oval table, some attendees may not be at an ideal viewing angle. The second rotating mechanism of the present invention is thus provided to the assembly so the apparatus can be rotated about a substantially vertical axis to facilitate viewing from a plurality of positions around a table or desk, for example.

It is still yet another aspect of the present invention that the carrying case be constructed from known materials and processes, and is thus inexpensive to manufacture. Thus, any commonly known material such as nylon, polypropylene, or leather can be used for the construction of the case. For applications outside the business world, where more durability may be required, the case could be manufactured from hard plastic or metal. Plastics, metals, or a composite materials may also be used for the supporting and rotating mechanisms. In addition, it will be appreciated that materials as described above are capable of being constructed of various colors, and advertisements or company logos may be interconnected, embossed, sewn, or otherwise displayed on the case in alternative embodiments of the present invention.

It is yet another aspect of the present invention that handles or pockets may be integrated into the design. Peripherals such as speakers, disc drives, and keyboards, are commonly used with electronic devices. Pockets, integrated into the case to accommodate these items, may be added for storage purposes. In addition, pockets for documents, pens, cell phones, pagers, and the like may be added to the inside or outside of the case.

It is yet another aspect of the present invention that the case may adapted for use by right-handed or left-handed individuals. More specifically, the attachment mechanism rotates so that when the case is opened like a book the attachment mechanism will be on the right-hand side. Alternatively, the attachment mechanism can be rotated 180 degrees before the case is shut such that when opened, the attachment mechanism will be located on the left and the electronic device will be in the proper orientation. Mechanisms for securing notes and writing instruments may be integrated into the side opposite the attachment mechanism.

Finally, it is another aspect of the present invention that the carrying case of the present invention be easily adapted for use with various types of tablet PCs, specifically, traditional and convertible tablets. In addition, the invention is easily scaled in size to be used, for example, with PDAs or other electronic devices.

Thus, it is one aspect of the present invention to provide a case adapted for storing and selectively positioning an electronic device which comprises:

a base panel with an inner surface, an outer surface, and at least four outer edges;

a cover panel operably interconnected to said base panel, with an inner surface, an outer surface, and at least four outer edges;

a supporting mechanism having an upper end and a lower end, said lower end operably interconnected to said inside surface of said base panel, wherein said supporting mechanism is capable of a first non-inclined position which is substantially parallel to said inner surface of said base, and at least a second inclined position;

an attachment mechanism adapted for removable interconnection with the electronic device; and a rotation mechanism operably interconnected to said supporting mechanism and said attachment means, wherein said attachment mechanism is adapted to rotate about an axis wherein the electronic device is capable of rotation at least about 90 degrees.

The summary of the invention is neither intended nor should it be construed as being representative of the full extent and scope of the present invention. The present invention is set forth in various levels of detail in the summary of the invention as well as in the attached drawings and the detailed description of the invention and no limitation as to the scope of the present invention is intended by either the inclusion or non-inclusion of elements, components, etc. in this summary of the invention.

BRIEF DESCRIPTION OF THE DRAWINGS

FIG. 12 is a front elevation view of the embodiment shown in FIG. 10, wherein the cover of the case is configured for left hand opening;

FIG. 13 is a top plan view of the embodiment shown in FIG. 12, wherein the cover of the case is configured for left hand opening.

DETAILED DESCRIPTION

Figure 1:
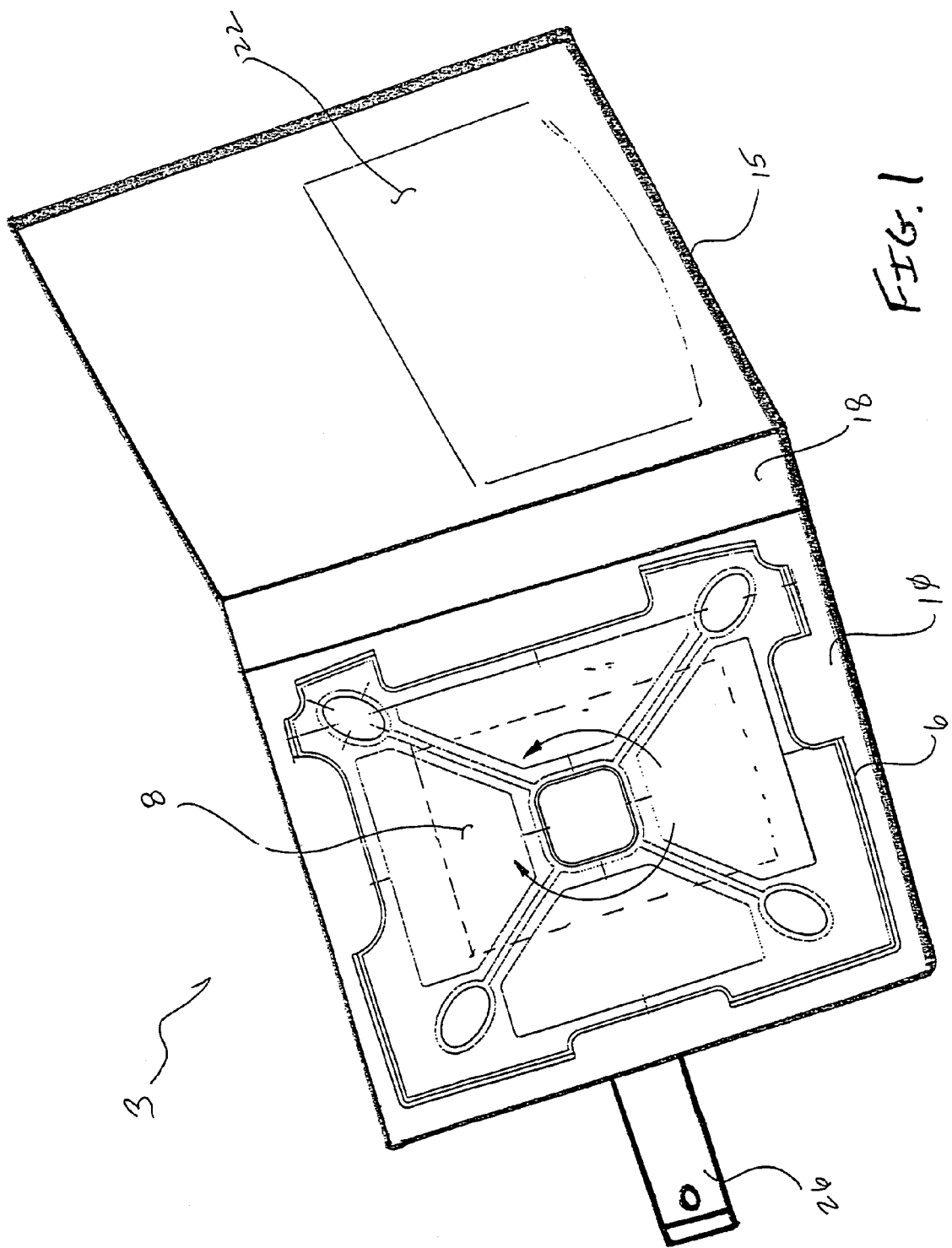
FIG. 1 is a perspective view of one embodiment of a case for an electronic device which is capable of selective positioning, and shown in an open position.

Referring now to the drawings, FIGS. 1-11 depict a carrying case for an electronic device. More specifically, an attachment mechanism adapted for use with a tablet PC is shown interconnected to a mechanism that allows a user to selectively incline and rotate the attachment mechanism and the interconnected tablet PC in order to facilitate data entry and multiple presentation modes.

Referring now to FIG. 1, one embodiment of the present invention is shown herein. More specifically, the rotatable attachment mechanism 6 is selectively interconnected to a support 8 which is interconnected to a base panel 10 of the case 3. The base 10 is interconnected to a folding cover 15 via a spine 18. The cover may be equipped with pockets 22 or other means for securing office products, and is designed to fold over the base 10 and contents in between the base 10 and the cover 15. A clasp 26 and associated locking mechanism may also be interconnected to the base 10, and which can be selectively interconnected to the cover 15 to maintain closure.

Figure 2:
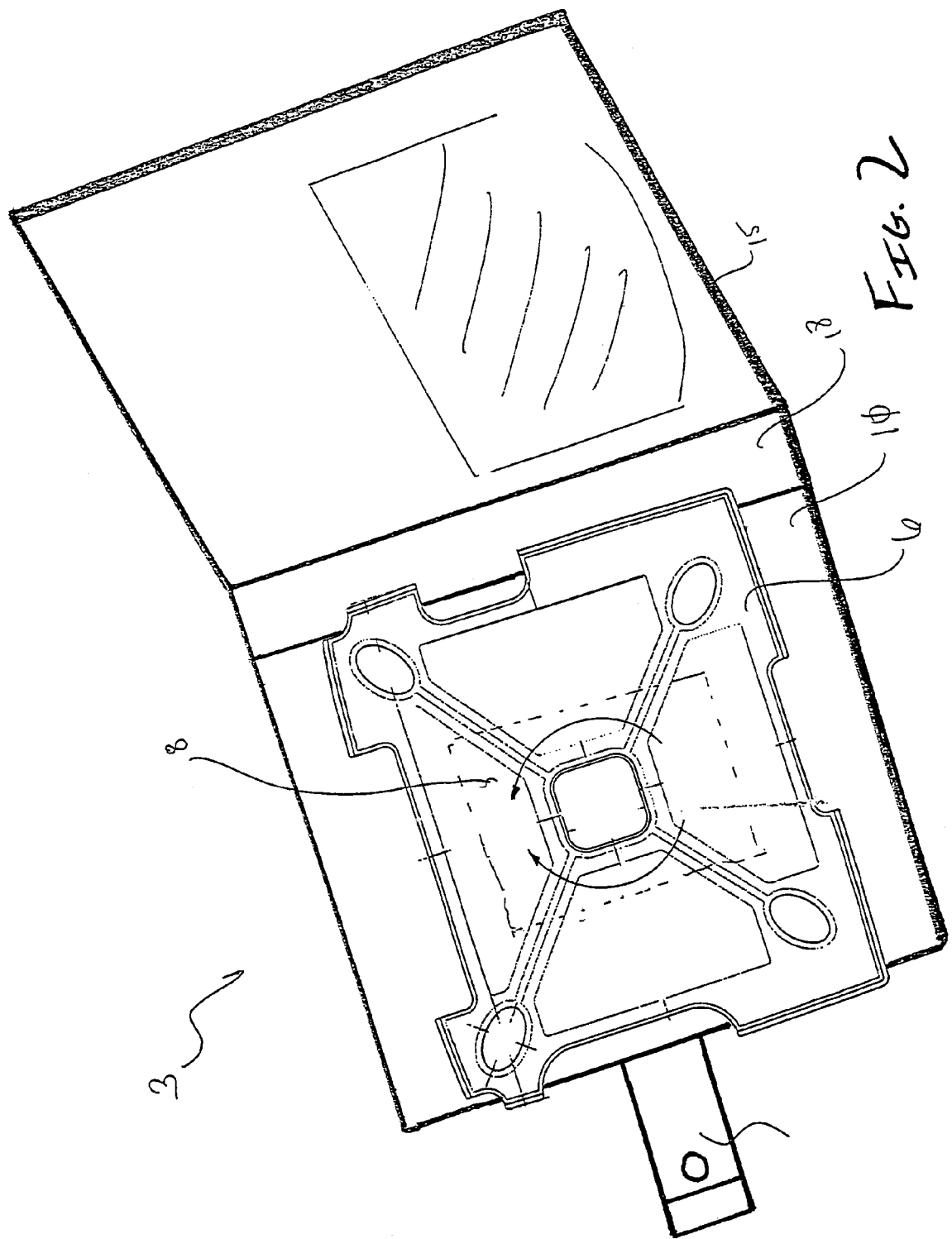
FIG. 2 is a perspective view of the embodiment shown in FIG. 1, wherein an attachment mechanism is rotated 90 degrees for landscape viewing.

Referring now to FIG. 2, the embodiment of FIG. 1 is shown in a rotated second position. As depicted, the cover 15 and/or spine 18 may interfere with a rotated attachment mechanism 6 when closure is initiated because larger attachment mechanisms 6 may overlap the sides of the base 10. By simply increasing the size of the base 10 so that there is no overlap between the rotated attachment mechanism 6 and the cover 15 and/or spine 18, any interference problems are eliminated.

The electronic device, such as a tablet PC, will be interconnected into the appropriately sized attachment mechanism 6 which is interconnected to the support 8. The electronic device will be interconnected to the attachment mechanism 6 by screws, bolts, hook and loop fasteners, glue, clamps, or the like. Alternatively, the attachment mechanism 6 may be equipped with a resiliently deflecting locking mechanism, or other fastening mechanism that is selectively interconnectable such that the user can insert and remove the device easily. When in transport, the cover 15 will generally be closed thereby protecting the electronic device inside. Preferably, the electronic device will be stowed in the case in a portrait orientation, as shown in FIG. 1, but the case 2 may be constructed to accommodate other storage orientations. When in use, the clasp 26 is unlatched, the cover 15 is opened, and the base 10 is laid on a surface. In addition, the inside of the cover 15 may be used as a mouse pad if necessary.

In one embodiment of the present invention, the support mechanism 8 is used to incline the electronic device, and the attachment mechanism 6 may be rotated to a plurality of positions to meet a user's particular viewing preference. When not in use, the support mechanism 8 is folded under the attachment mechanism 6, the attachment mechanism 6 is rotated back to the stowed position, the cover 15 is closed, and the clasp 26 is fastened to the cover 15. In some applications, the case may be constructed with a larger base 10. In this embodiment, rotation of the attachment mechanism 6 may not be required, because there will be no closing obstructions. Preferably, the clasp 26, or other latching device, such as a latch, hook and loop fasteners, snaps, or other selectively interconnecting device is used to provide greater protection to the electronic device, but the case may be constructed without such a feature.

Figure 3:
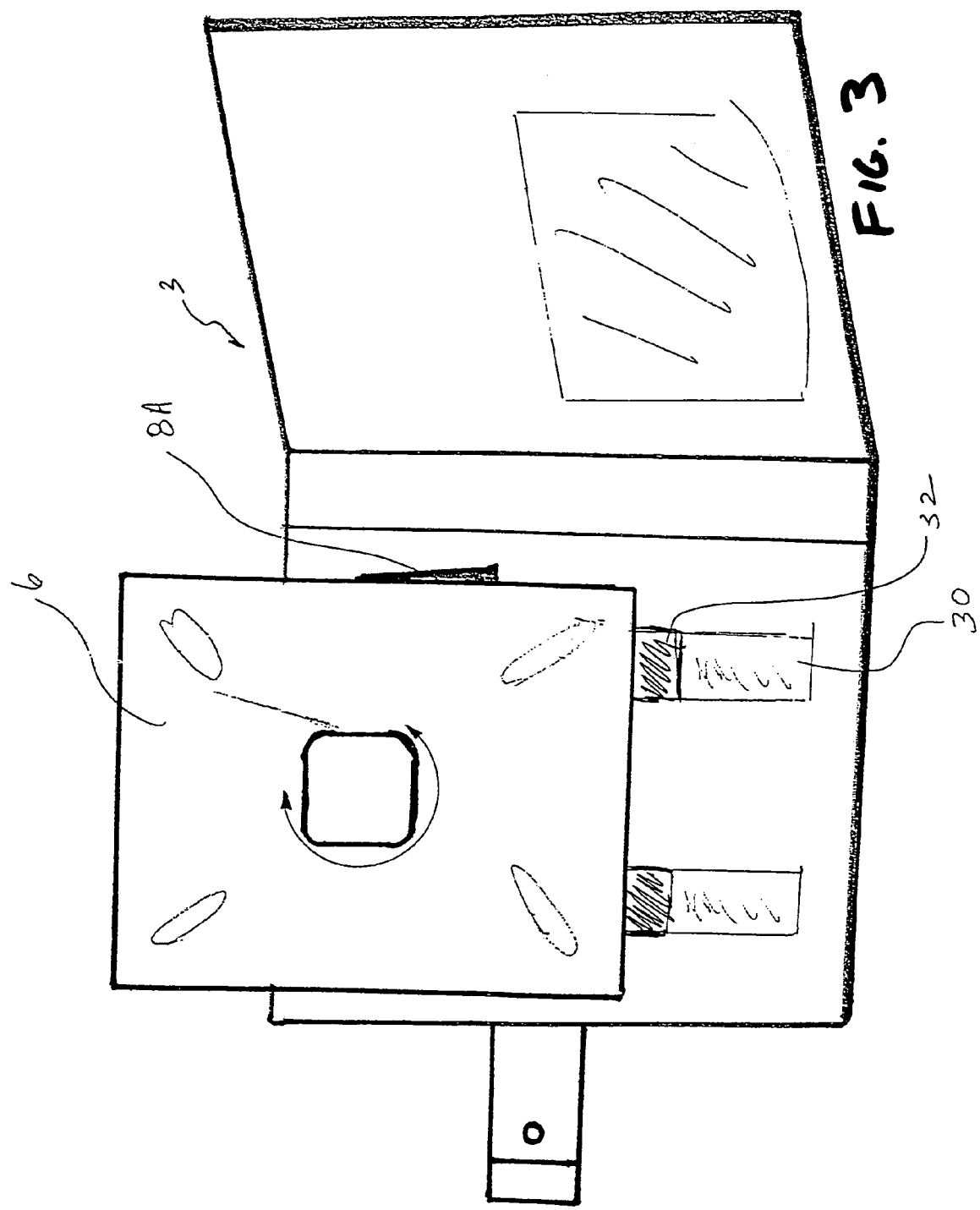
FIG. 3 is perspective view of the embodiment shown in FIG. 1, wherein the attachment mechanism is inclined.
Figure 4:
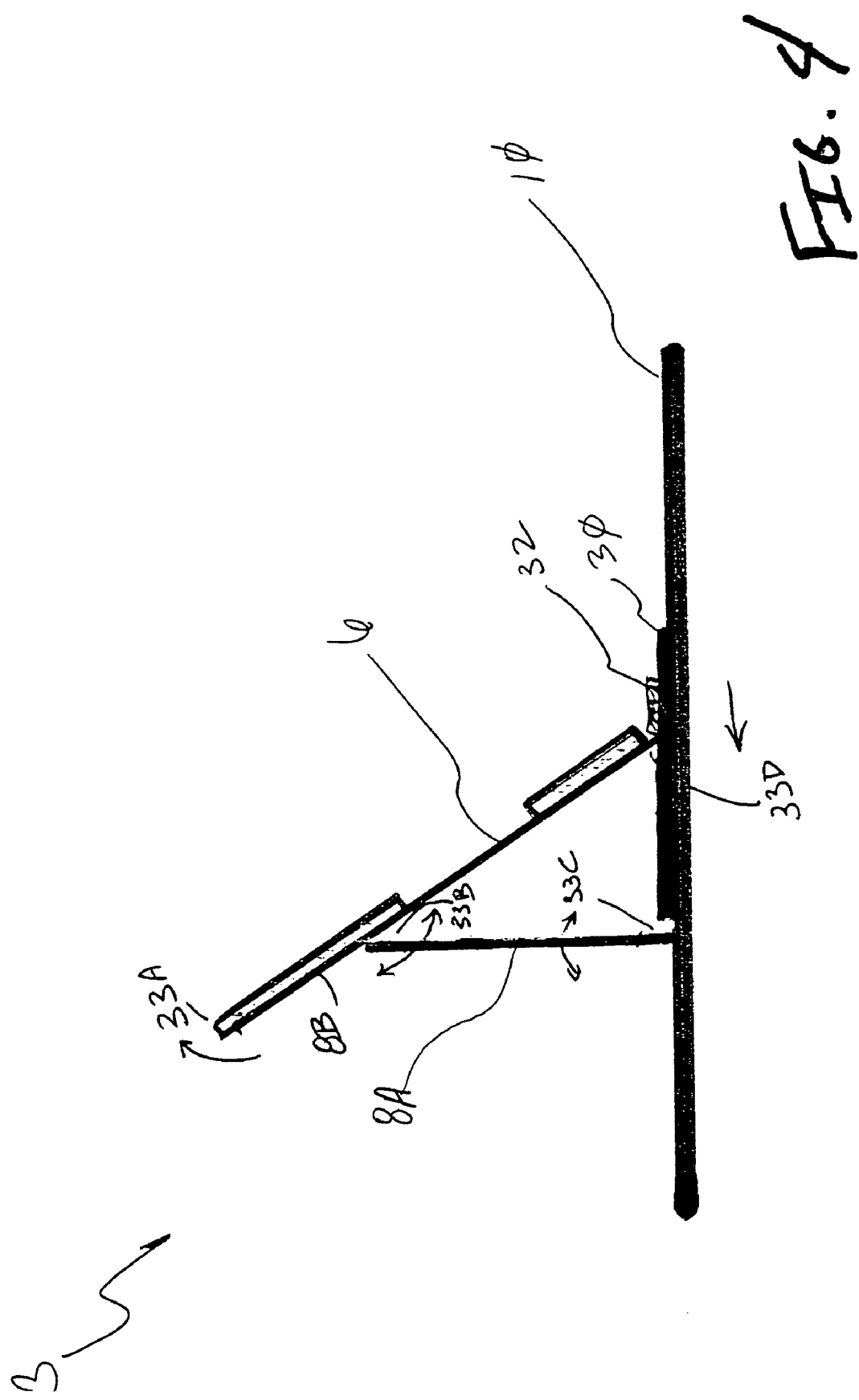
FIG. 4 is a left elevation view of the embodiment shown in FIG. 1, wherein the attachment mechanism is in an inclined position.
Figure 5:
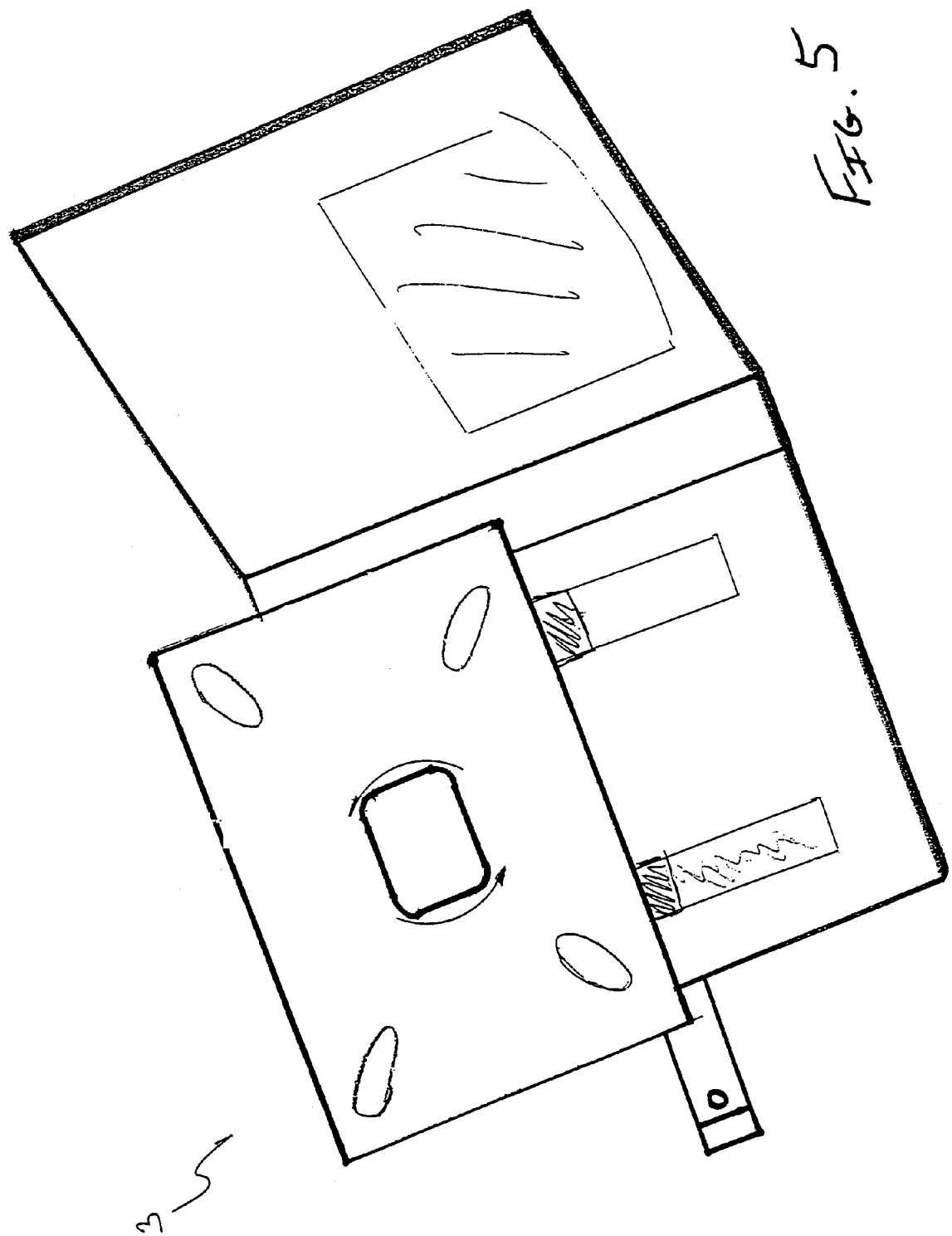
FIG. 5 is a perspective view of the embodiment shown in FIG. 1, wherein the attachment mechanism is inclined and rotated 90 degrees for landscape viewing.

Referring now to FIGS. 3 through 5, one embodiment of the present invention is shown with the attachment mechanism in an inclined position. The rotatable attachment mechanism 6 is shown tilted and propped up by the support mechanism 8. In one embodiment, the support 8 is used in conjunction with hook and loop fasteners which allow the user to adjust the tilt angle as desired. More specifically, strips 30 of one half of the fastener are interconnected to the base 10, and tabs 32 of the other half of the fastener combination are interconnected to the support mechanism 8. In one embodiment, the support mechanism 8 includes at least the supporting portion 8A, which is hingedly interconnected to the base 10 and a portion of the support 8B that interfaces with the attachment mechanism 6. When not inclined, the support portion 8A is folded under the interface portion 8B. To incline the support mechanism the user lifts at or near an upper edge 33A of the attachment mechanism 6, which in turn rotates the support portion 8A around the hinged interconnections 33B & 33C, thus causing the bottom edge 33D to move toward the hinge connection on the base 33C. The fastener combination 30 & 32 is then selectively interconnected to set the desired viewing angle. To stow the electronic device these steps are performed in reverse. It will be appreciated by one skilled in the art that other interconnecting means 30 & 32 can be employed with similar results, such as snaps. Other support mechanisms may also be employed to achieve the same effect. Preferably, the attachment mechanism 6 is constructed in such a way that it allows free rotation while tilted since there is sufficient space between the attachment mechanism 6 and the base 10. However, some applications may require that the attachment mechanism 6 be constructed long and narrow, such that the attachment mechanism 6 would have to be positioned flat to allow for rotation.

Figure 6:
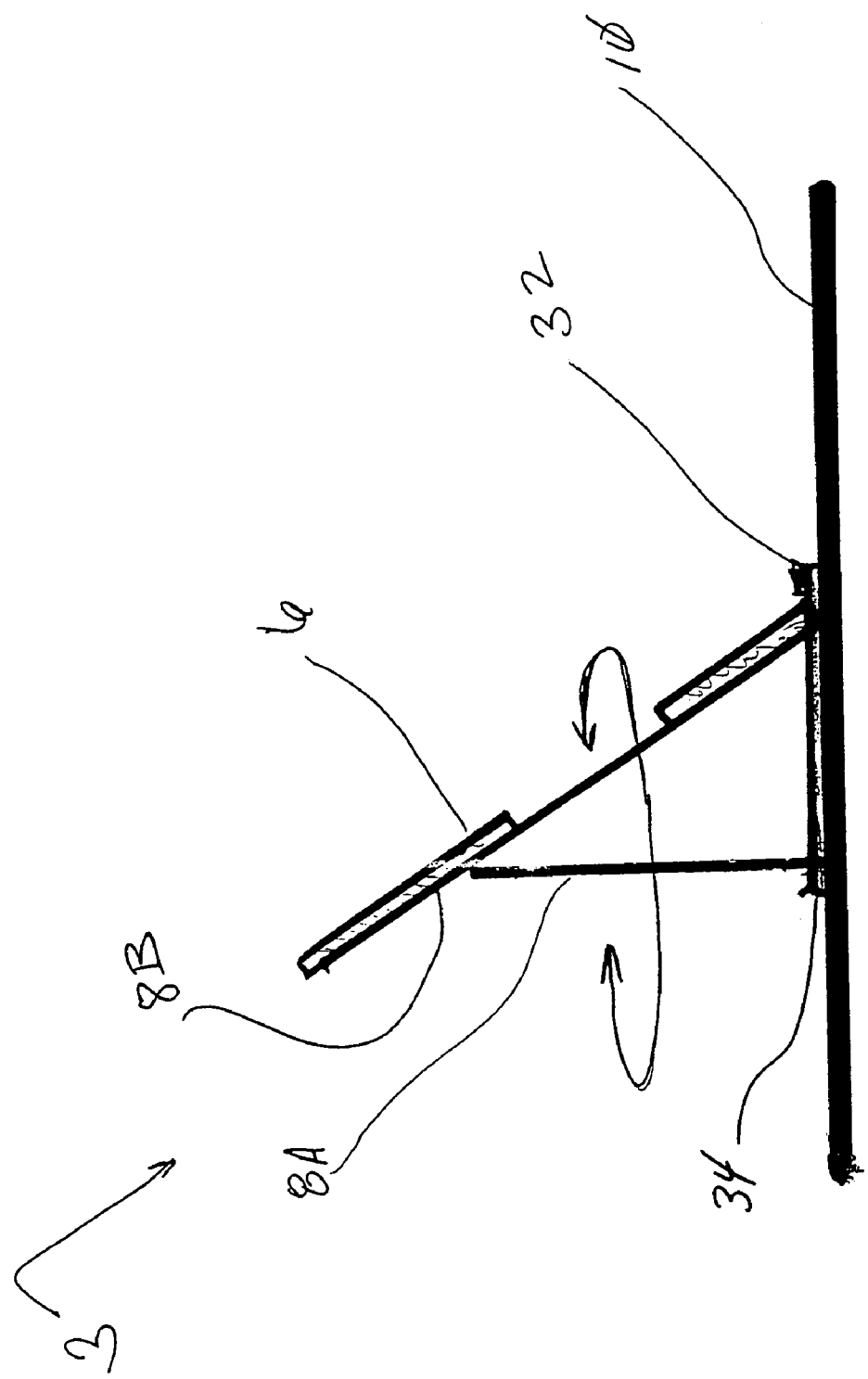
FIG. 6 is a left elevation view of the embodiment shown in FIG. 1, wherein the attachment mechanism is inclined, and further comprising a second rotation mechanism.

Referring now to FIG. 6, an alternative embodiment of the present invention is provided herein and is capable of additional adjustment. More specifically, a second rotating mechanism 32 is integrated into the base 10. The support mechanism 8 is interconnected to the second rotation mechanism 34 such that it is easily rotated in the plane of the base 10. As shown in FIG. 6, the second rotating mechanism allows the electronic device to be rotated around a substantially vertical axis, and thus allows viewing by multiple attendees sitting at a table, for example. Preferably, the second rotation mechanism 34 is constructed similarly to the first rotation mechanism such that locking features are supplied. Thus, locking would prevent unwanted rotation when inputting information in the tilted position.

Figure 7:
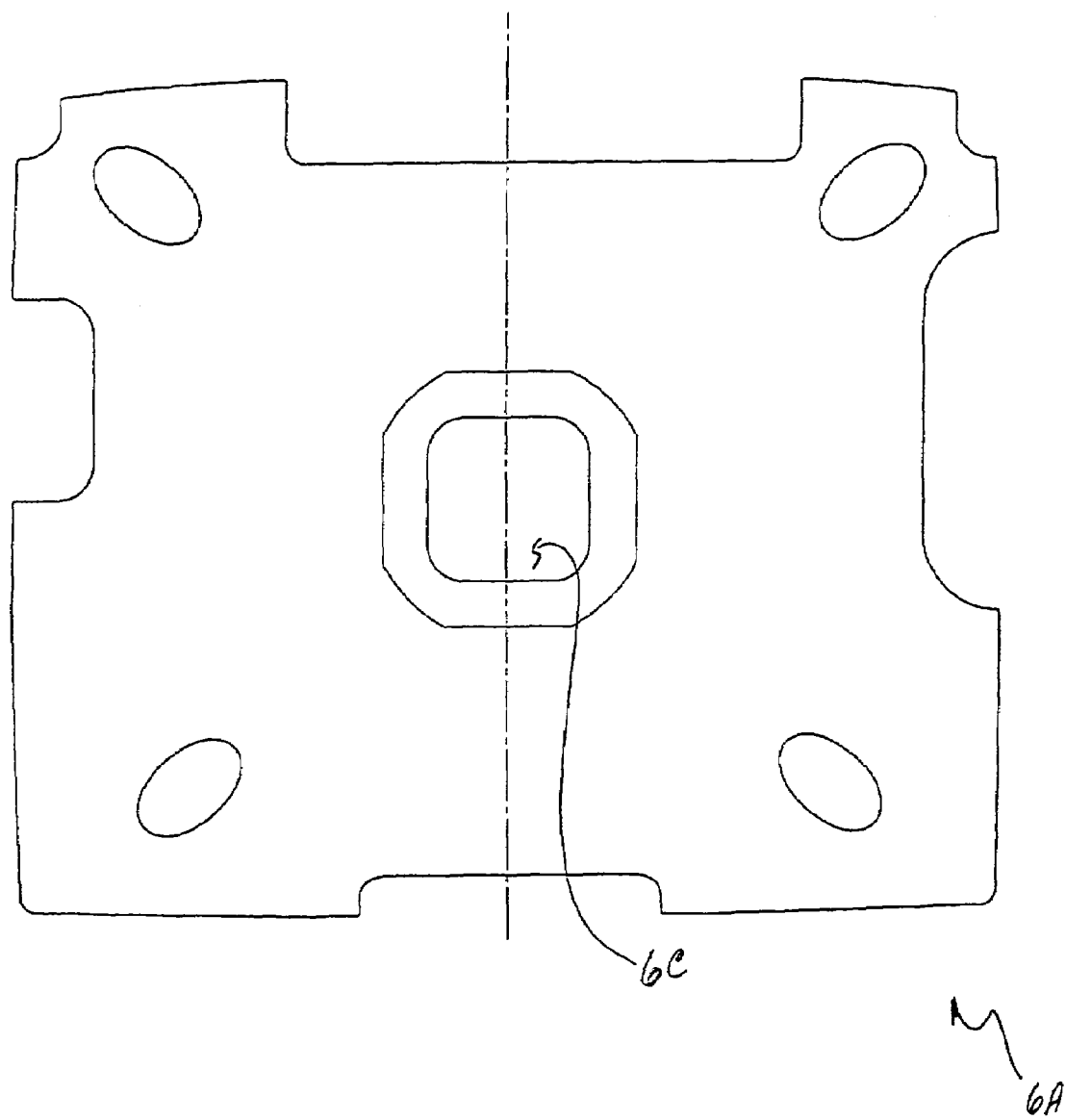
FIG. 7 is a top plan view depicting an interface plate in one embodiment of the attachment mechanism.
Figure 8:
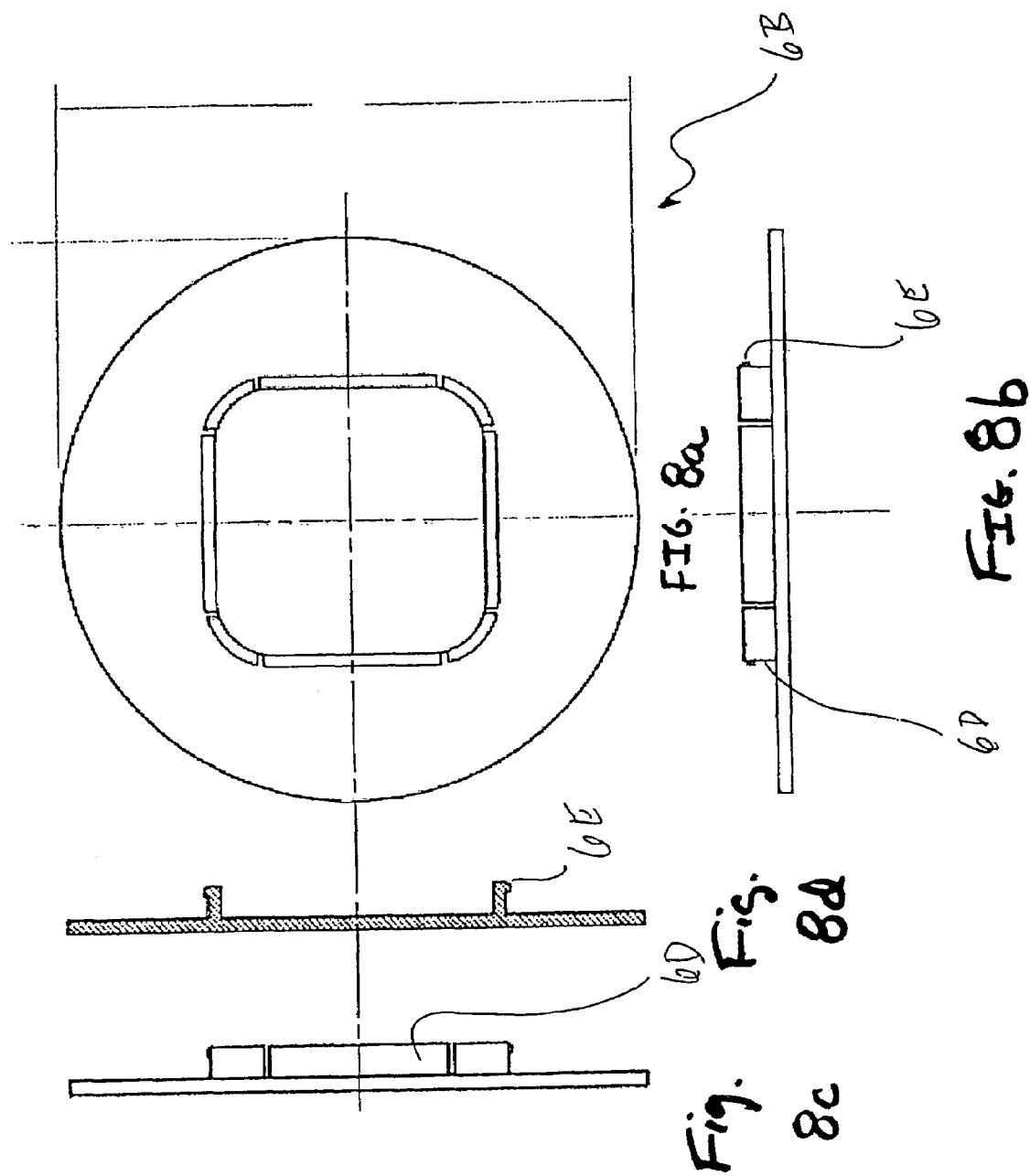
FIGS. 8A, 8B, 8C and 8D are top plan, front elevation, and left elevation views, respectively of a swivel backing used in conjunction with the embodiment shown in FIG. 7.
Figure 9:
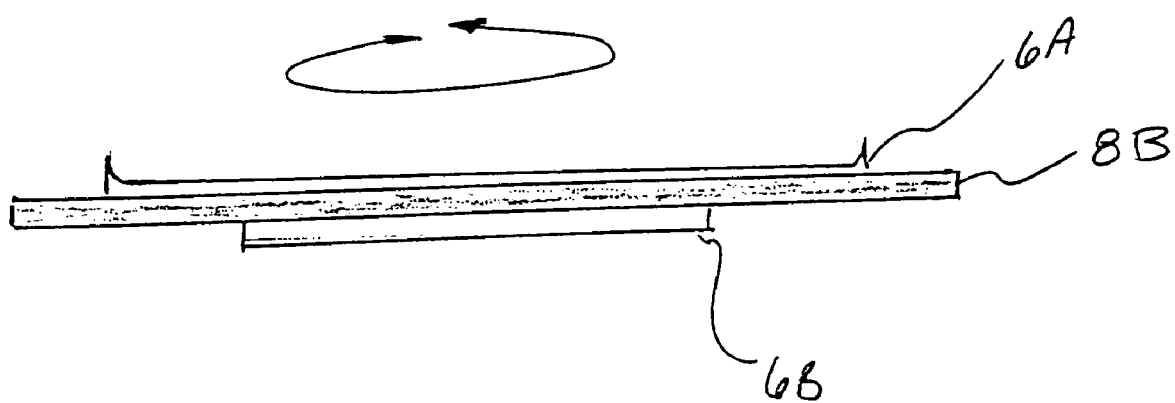
FIG. 9 is a front elevation view of an embodiment of the present invention employing a rotation mechanism with an interface plate and a swivel backing, and wherein portions of the present invention are omitted for clarity.

Referring now to FIGS. 7-9, a spool-like rotation mechanism used to provide rotation to the attachment mechanism 6, support mechanism 8, or both is shown herein. Preferably, the electronic device is interconnected to an interface plate 6A with a countersunk hole 6C provided therein. The hole 6C will be placed over a hole having a slightly larger diameter than provided in the support mechanism interface 8B. A swivel backing 6B, equipped with a neck 6D and tabs 6E can then be placed on the opposite side of the support mechanism interface 8B, wherein the neck will pass through the hole in the support 8B and the tabs 6E will resiliently deflect and snap onto the lip of the counter sunk hole 6C. The electronic device is then capable of rotation around the axis of the hole 6C, and will be held transversely with respect to the axis of rotation by the interaction of the interface plate 6A, the swivel backing 6B, and interface portion of the support mechanism 8B. Alternatively, a turntable type rotational mechanism may be used, wherein rotation is provided by the interaction of a plurality of ball bearings sandwiched between inner and outer raceways. As appreciated by one skilled in the art, any number of devices may be employed which impart rotational movement and the present invention is not limited to any one specific device.

Figures 10, 11:
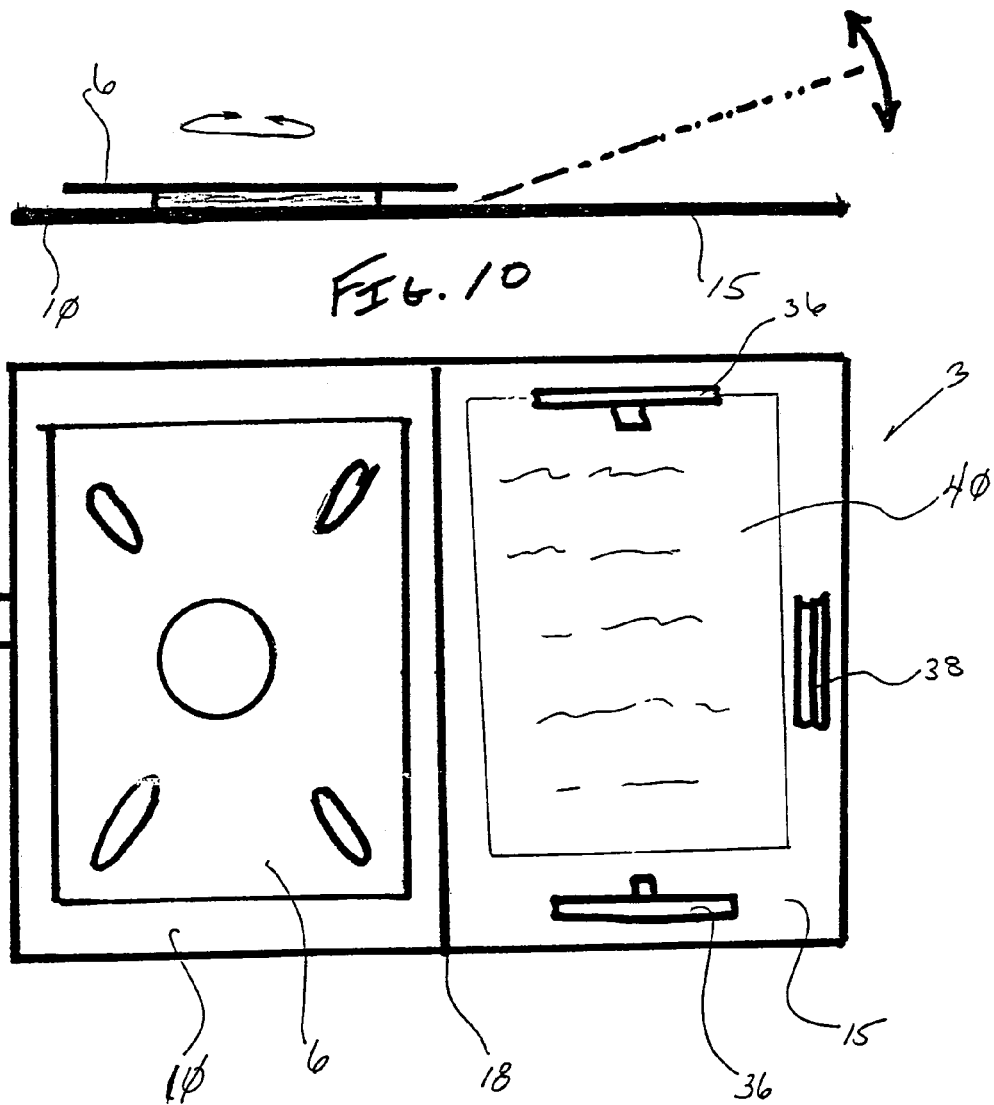
FIG. 10 is a front elevation view of the embodiment shown in FIG. 1, wherein the cover of the case is configured for right hand opening.
FIG. 11 is a top plan view of the embodiment shown in FIG. 10, wherein the cover of the case is configured for right hand opening.

Referring now to FIGS. 10 and 11, an alternative embodiment of the present invention is shown herein where the case is configured for right-handed opening. More specifically, the base 10, the attachment mechanism 6, rotation mechanism 34, and the electronic device, are on the left hand side of the user when the cover 15 is opened. This configuration of use is well suited for those who may prefer their working materials, such as a legal pad, writing instruments, or mouse on the right. A clipboard-like or other type of holding mechanism 36 and writing instrument holders 38 may be interconnected or integrated into the cover 15 in order to hold a user's notes 40, for example, when he or she is working with the case 3 on their lap. Alternatively, the spine 18 may be flexible such that the entire cover 15 can be folded behind the base 10 so that the working area is reduced.

Referring now to FIGS. 12 and 13, an alternative embodiment of the present invention is shown herein where the cases described above are configured for left-handed opening. Thus, the base 10, the attachment mechanism 6, rotation mechanism 34, and the electronic device, are on the right hand side of the user when the cover 15 is opened. This configuration of use is well suited for those who may prefer their working materials, such as a legal pad, writing instruments, or mouse on the left. A clipboard-like or other type of holding mechanism 36 and writing instrument holders 38 may be interconnected or integrated into the cover 15 in order to hold a user's notes 40, for example, when he or she is working with the case 3 on their lap. Alternatively, the spine 18 may be made flexible such that the entire cover 15 can be folded behind the base 10 so that the working area is reduced.

Figure 14:
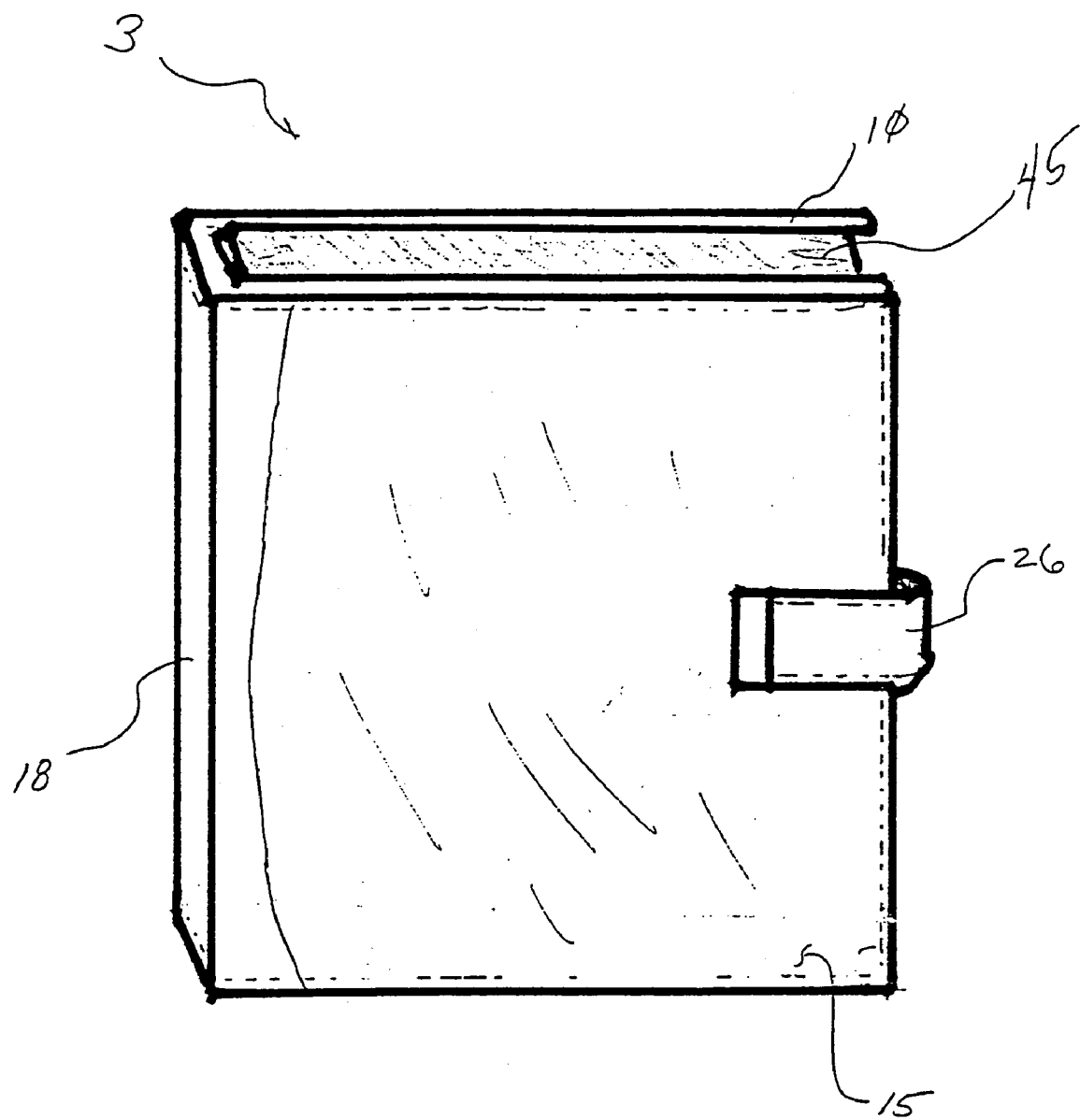
FIG. 14 is a perspective view of the embodiment shown in FIG. 12, wherein the cover is in a closed position.

Referring to now FIG. 14, one embodiment of the present invention is shown herein in a closed position. The cover 15 is folded over the electronic device 45 and the clasp 26 is selectively interconnected to it when not in use or during transportation. It can be readily seen that padding may be added to the cover 15, back 10 and/or spine 18 to increase the protection afforded to the electronic device 45.

To provide clarity to the present invention, the various components found in the drawings, and the numbering of the various components are provided herein:

| # | Component |
|---|---|
| 3 | Carrying case |
| 6 | Rotatable attachment mechanism |
| 6A | Interface plate |
| 6B | Swivel backing |
| 6C | Interface plate hole |

-continued

| # | Component |
|---|---|
| 6D | Swivel neck |
| 6E | Neck tabs |
| 8 | Support mechanism |
| 8A | Support portion of the support mechanism |
| 8B | Support mechanism interface |
| 10 | Base |
| 15 | Cover |
| 18 | Spine |
| 22 | Pocket |
| 26 | Clasp |
| 30 | Strip of hook and loop fastener |
| 32 | Tab of hook and loop fastener |
| 33A | Upper edge |
| 33B | Hinged interconnection |
| 33C | Hinged interconnection |
| 33D | Bottom edge |
| 34 | Rotating mechanism |
| 36 | Note holder |
| 38 | Pen holder |
| 40 | Notes |
| 45 | Electronic device |

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the claims that follow.

What is claimed is:

1. A case adapted for storing and selectively positioning an electronic device in a plurality of positions, comprising:
a base panel with an inner surface, an outer surface, and at least four outer edges;
a cover panel operably interconnected to said base panel, with an inner surface, an outer surface, and at least four outer edges for covering said base panel;
at least one pocket integrated into said inner surface of said cover, wherein said pocket is adapted to secure writing instruments;
a supporting mechanism having an upper end and a lower end, said lower end operably interconnected to said inside surface of said base panel, wherein said supporting mechanism is capable of a first non-inclined position which is substantially parallel to said inner surface of said base, and at least a second inclined position;
an attachment mechanism adapted for removable interconnection with the electronic device; and
a rotation mechanism operably interconnected to said supporting mechanism and said attachment mechanism, wherein said attachment mechanism is adapted to rotate about an axis wherein the electronic device is capable of rotation at least about 90 degrees.

2. The case of claim 1, wherein said attachment mechanism is adapted for use with a tablet personal computer.

3. The case as in claim 1, further comprising a closure mechanism for selectively securing said base panel to said cover panel.

4. The case of claim 1, wherein the material of said cover panel and base panel are predominately compliant.

5. The case of claim 1, wherein said attachment mechanism comprises a plurality of resilient arms which are selectively deflectable to allow interconnection and release of the electronic device.

6. The case of claim 1, wherein said attachment mechanism includes at least an attachment plate and a fastening device for operable interconnection to said rotating mechanism, said fastening device comprising at least one of a bolt, a screw and an adhesive.

7. The case of claim 1, wherein said rotating mechanism includes a locking mechanism, wherein said locking mechanism is capable of selectively securing the electronic device in at least two distinct positions of use.

8. The case of claim 1, further comprising a second rotation mechanism operably interconnected to said base panel and said supporting mechanism, wherein said supporting mechanism is adapted to rotate at least about 90 degrees about a substantially vertical axis.

9. A case adapted for storing and selectively positioning an electronic device in a plurality of positions, comprising:
   a base panel with an inner surface, an outer surface, and at least four outer edges;
   a cover panel operably interconnected to said base panel, with an inner surface, an outer surface, and at least four outer edges for covering said base panel;
   at least one sleeve integrated into said inner surface of said cover that is adapted to secure a plurality of sheet materials;
   a supporting mechanism having an upper end and a lower end, said lower end operably interconnected to said inside surface of said base panel, wherein said supporting mechanism is capable of a first non-inclined position which is substantially parallel to said inner surface of said base, and at least a second inclined position;
   an attachment mechanism adapted for removable interconnection with the electronic device; and
   a rotation mechanism operably interconnected to said supporting mechanism and said attachment mechanism, wherein said attachment mechanism is adapted to rotate about an axis wherein the electronic device is capable of rotation at least about 90 degrees.

10. The case of claim 9, wherein said attachment mechanism is adapted for use with a tablet personal computer.

11. The case as in claim 9, further comprising a closure mechanism for selectively securing said base panel to said cover panel.

12. The case of claim 9, wherein the material of said cover panel and base panel are predominately compliant.

13. The case of claim 9, wherein said attachment mechanism comprises a plurality of resilient arms which are selectively deflectable to allow interconnection and release of the electronic device.

14. The case of claim 9, wherein said attachment mechanism includes at least an attachment plate and a fastening device for operable interconnection to said rotating mechanism, said fastening device comprising at least one of a bolt, a screw and an adhesive.

15. The case of claim 9, wherein said rotating mechanism includes a locking mechanism, wherein said locking mechanism is capable of selectively securing the electronic device in at least two distinct positions of use.

16. The case of claim 9, further comprising a second rotation mechanism operably interconnected to said base panel and said supporting mechanism, wherein said supporting mechanism is adapted to rotate at least about 90 degrees about a substantially vertical axis.

* * * * *